United States Patent
Gailloux et al.

(10) Patent No.: US 8,645,238 B1
(45) Date of Patent: Feb. 4, 2014

(54) PREPAID MULTI-LINE PLAN INFRASTRUCTURE AND METHODS

(75) Inventors: Michael A. Gailloux, Overland Park, KS (US); Kenneth J. Raaf, Laguna Niguel, CA (US); Kenneth W. Samson, Belton, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 356 days.

(21) Appl. No.: 13/149,496

(22) Filed: May 31, 2011

(51) Int. Cl.
*G07F 19/00* (2006.01)
*H04M 15/00* (2006.01)
*G06Q 30/04* (2012.01)
*H04M 11/00* (2006.01)

(52) U.S. Cl.
CPC ........... *G06Q 30/04* (2013.01); *H04M 2215/32* (2013.01)
USPC ................ 705/34; 705/30; 455/405; 455/406

(58) Field of Classification Search
USPC ............................... 705/30, 34; 455/405, 406
See application file for complete search history.

(56) References Cited

U.S. PATENT DOCUMENTS

| | | | |
|---|---|---|---|
| 7,174,155 B2 * | 2/2007 | Kotaluoto et al. | 455/406 |
| 7,958,022 B2 * | 6/2011 | Goyal et al. | 705/30 |
| 8,195,783 B2 * | 6/2012 | Crimi et al. | 709/223 |
| 2003/0125968 A1 * | 7/2003 | Uppal | 705/1 |
| 2010/0131393 A1 * | 5/2010 | Pattabiraman et al. | 705/30 |

* cited by examiner

*Primary Examiner* — Scott Zare (57) ABSTRACT

A system is provided. An application determines a consolidated cycle date for a master prepaid account where a cycle date comprises the first day of usage periods for prepaid accounts. The application determines that a first prepaid account is associated with a first cycle date and a second prepaid account is associated with a second cycle date where the first, second, and consolidated cycle date differ from each other. A first and second prorated amount is determined by multiplying a remaining fraction of a current first and second usage period times a first and second periodic payment, respectively. The first prorated amount is added to the second prorated amount to determine a first credit. Individual billing is discontinued for the first and second prepaid account. The first credit is applied to a first master payment amount payable on the consolidated cycle date under the master prepaid account.

7 Claims, 4 Drawing Sheets

PREPAID MULTI-LINE PLAN INFRASTRUCTURE AND METHODS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile telephones are electronic devices used for mobile voice or data communication based on network connectivity provided by base stations known as cell towers or sites. A prepaid mobile phone is a mobile phone for which credit is purchased in advance of service use. The purchased credit is used to pay for mobile phone services at the point the service is accessed or consumed. If there is no available credit then access to the requested service is denied by the mobile phone network. Users are able to purchase additional credit and have it assigned to their prepaid account at any time.

SUMMARY

In an embodiment, a system is disclosed. The system comprises a processor, a memory, and an application stored in the memory. When executed by the processor, the application determines a consolidated cycle date for a master prepaid account where a cycle date comprises the first day of usage periods for prepaid accounts and where payments for prepaid accounts are due on cycle dates. The application determines that a first prepaid account is associated with a first cycle date for a first usage period and a second prepaid account is associated with a second cycle date for a second usage period where the first cycle date, the second cycle date, and the consolidated cycle date differ from each other. A first prorated amount is determined by multiplying a first fraction times a first periodic payment associated with the first usage period of the first prepaid account where the first fraction comprises a remaining fraction of a current first usage period. A second prorated amount is determined by multiplying a second fraction times a second periodic payment associated with the second usage period of the second prepaid account and where the second fraction comprises a remaining fraction of a current second usage period. The first prorated amount is added to the second prorated amount to determine a first credit. Individual billing is discontinued for the first prepaid account and second prepaid account. The first credit is applied to a first master payment amount payable on the consolidated cycle date under the master prepaid account.

In an embodiment, a processor implemented method is disclosed. The method comprises creating a master account for consolidation of a first prepaid account and a second prepaid account. The first prepaid account is associated with a first cycle date were the first cycle date is the first day of a first usage period of the first prepaid account. The second prepaid account is associated with a second cycle date where the second cycle date is the first day of a second usage period of the second prepaid account and where the second cycle date differs from the first cycle date. A first prorated amount is determined by multiplying a first fraction times a first periodic payment associated with the first usage period where the first fraction is calculated by dividing a first quantity of days from a first closing date of the first account to the end of the current first usage period by first total number of days in the first usage period. A second prorated amount is determined by multiplying a second fraction times a second periodic payment associated with the second usage period where the second fraction is calculated by dividing a second quantity of days from a second closing date of the second account to the end of the current second usage period by second total number of days in the first usage period, and where the sum of the second prorated amount and the first prorated amount comprises a third credit. The first closing date and the second closing date are determined based on maximizing the third credit where the first closing date, the second closing date, and a third cycle date fall on the same day, where the master account is started and the first prepaid account and the second prepaid account are closed and consolidated into the master account on the third cycle date.

In an embodiment, a processor implemented method is disclosed. The method comprises receiving a request to change a first cycle of a first prepaid account and a second cycle of a second prepaid account to a third cycle of a third postpaid account where payment for services provided under the first prepaid account and the second prepaid account is henceforth to be made on a postpaid basis under the third postpaid account. A first prorated amount is determined associated with the first prepaid account comprising applying a first daily rate to a first quantity of days from the end of a current first usage period of the first prepaid account to the next payment date of the third postpaid account where the first daily rate is determined by dividing a first periodic prepaid amount paid at the beginning of the first usage period by the quantity of days in the first usage period. A second prorated amount is determined associated with the second prepaid account comprising applying a second daily rate to a second quantity of days from the end of a current second usage period of the second prepaid account to the next payment date of the third postpaid account where the second daily rate is determined by dividing a second periodic prepaid amount paid at the beginning of the second usage period by the quantity of days in the second usage period. A first top-up amount is determined comprising the sum of the first prorated amount and the second prorated amount. The first top-up amount is added to the next due payment of the third postpaid account. Billing of the first prepaid account and the second prepaid account is discontinued. The first periodic prepaid amount and the second periodic prepaid amount is added to the payment amount of the third postpaid account following the next due payment of the third postpaid account and succeeding payments of the third postpaid account.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a system and methods of merging a plurality of prepaid wireless accounts 72, 74 into an existing or new multi-line account. A single deposit account is established for the multi-line account and wireless services under the account are paid for by charges to the deposit account. When the prepaid wireless accounts 72, 74 are being merged and therefore terminated as independent accounts at times other than their cycle dates, an application provided herein calculates credits for paid but unused time or usage units. These credits are then applied to amounts owing on the multi-line account containing the merged prepaid wireless accounts 72, 74. When the paid periods of the merging prepaid wireless accounts 72, 74 end before the scheduled start date or next payment date of the multi-line account and the prepaid accounts do not make their regular payments, the system calculates interim or topup amounts owing for the merging accounts for the interim period. The system adds these amounts to the first or next payment of the multi-line account. The system calculates prorated amounts for credits or charges associated with the merging prepaid wireless accounts 72, 74. The system preserves the value already paid in by subscribers or calculates the topup charges when merging the accounts into a multi-line account.

A telecommunications service provider may wish to reduce prepaid account turnover or churn as well as more tightly manage its billing and other account management costs. The provider may determine that merging prepaid accounts into multi-line accounts may reduce turnover, provide economies of scale, and boost account profitability. The provider may offer incentives to companies or other organizations with employees or other users subscribing under individual prepaid plans to merge the accounts. An employer with multiple employees using mobile telephones under individual prepaid plans, each with a different cycle date, may be tasked with processing small reimbursement requests from the employees for their monthly subscription amount. This may be burdensome on the employer's payables function as well as unwieldy from a budgeting, expense auditing, and cash flow perspective. Both the telecommunications service provider and the employer may find sound business reasons for causing individual prepaid accounts to be merged into a new or existing multi-line account.

The multi-line account may itself be a prepaid account or may alternatively be a postpaid account. The multi-line account may consolidate existing wireless accounts which may be prepaid wireless accounts 72, 74, postpaid wireless accounts, or both, and the multi-line account may receive incentives to be a prepaid or postpaid account itself. The single deposit account created for the multi-line account may be accessible by a designated lead user that is provided authorization to allow other users to selectively draw on the deposit account to purchase ring tones, wallpapers, and other electronic products or to access premium services such as making international calls. The multi-line account may be configured to obligate the lead user to make the single monthly payment for usage by the plurality of devices but permit other users to selectively draw on the associated deposit account for limited purchases of inexpensive items such as ring tones. The lead user may selectively provide or deny permission to other users to draw on the deposit account for various purposes. In an embodiment, individual users may be provided sub-accounts within the deposit account into which they may deposit funds for their own use in making purchases.

The system provided herein provides an online site for access by users of portable electronic devices covered under the multi-line account or joining the multi-line account. When a prepaid wireless account is being merged into a multi-line account, the subscriber associated with the merging account, the lead user of the multi-line account, or another designated party may access the online site and cause the prepaid account to be joined into the multi-line account. The application accesses a rating engine and a billing system of the telecommunications service provider in calculating pricing. The application uses the rating engine to adjust pricing associated with adding the merging account and determines any associated volume-related or other discounts. The application also calculates any credits owed by the provider to the multi-line account associated with the prepaid account terminating with an outstanding balance of funds, paid time or paid usage units. For example, the prepaid account may have funded the account and have money left on the account, or the account may have unused minutes or unused texts, or possibly both that would be applied to the multi-line account. Additionally, if the prepaid account was on a monthly unlimited plan with 5 days usage left, the application would calculate a credit amount for the 5 days and would apply the credit to the multi-line account. This provides value to the merging prepaid subscriber. The application alternatively calculates interim charges associated with paid time expiring before the first or next due payment of the multi-line account when prepaid subscribers do not make final payments. The application creates records of the calculations and makes these records available to the lead user or designated other parties for examination. The records explain how any value remaining in the merging prepaid account was calculated and applied to the multi-line account. The records provide a reconciliation of the credits or charges associated with the merging accounts and amounts then due under the multi-line account.

Figure 1:
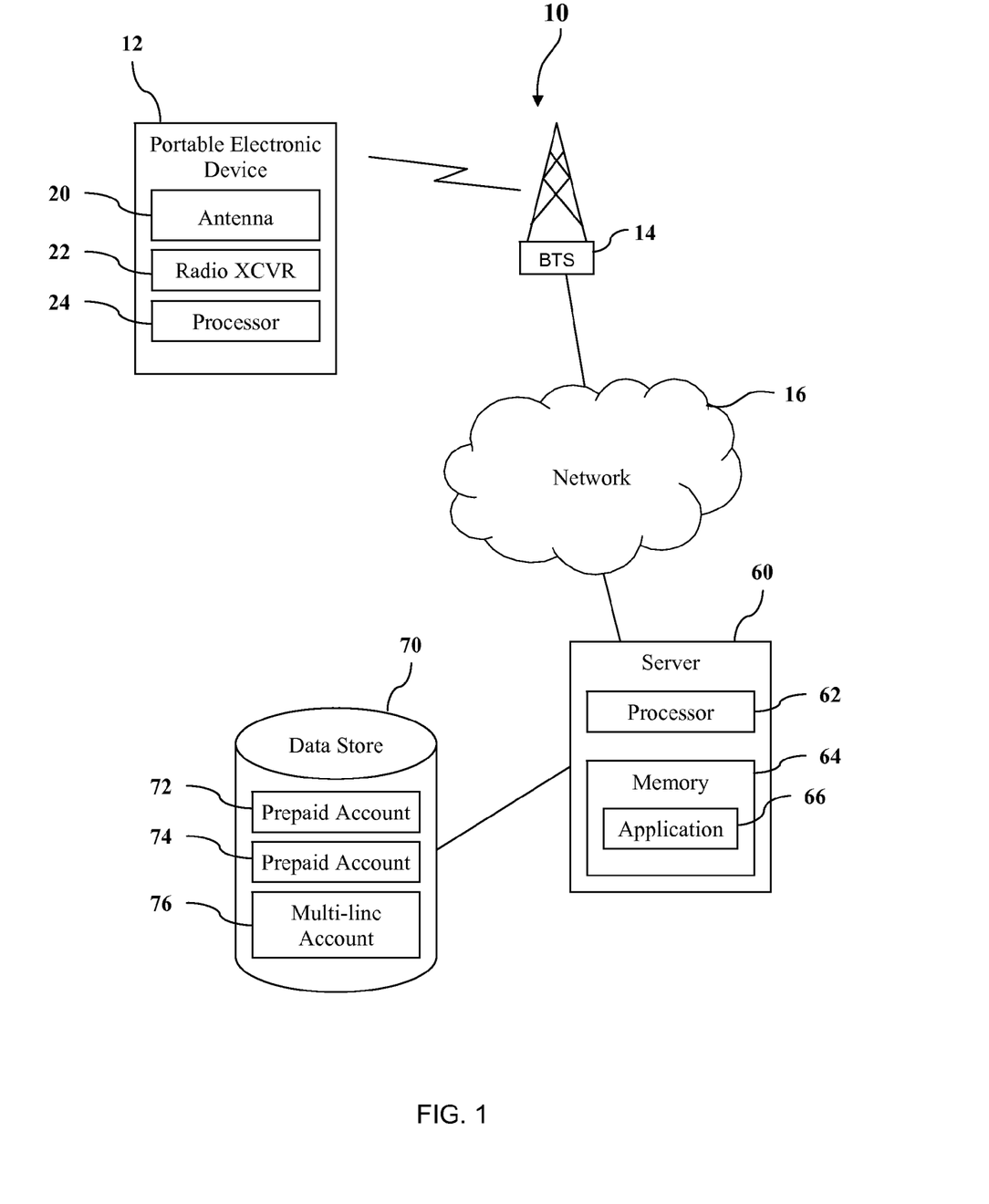
FIG. 1 is a block diagram of a communication system according to an embodiment of the disclosure.

Turning now to FIG. 1, a system 10 is described. The system 10 comprises a portable electronic device 12, a base transceiver station 14, a network 16, a server 60, and a data store 70. The portable electronic device 12 comprises an antenna 20, a radio transceiver 22 coupled to the antenna 20, and a processor 24. The portable electronic device 12 may be a mobile phone, a personal digital assistant (PDA), a media player, or other network enabled electronic device. The base transceiver station 14 provides a communication link to the portable electronic device 12 and couples the portable electronic device 12 to the network 16. In an embodiment, the base transceiver station 14 provides a wireless communication link to the portable electronic device 12 according to one or more of a code division multiple access (CDMA) wireless protocol, a global system for mobile communications (GSM) wireless protocol, a long term evolution (LTE) wireless protocol, a worldwide interoperability for microwave access (WiMAX) wireless protocol, or another wireless protocol. While a single base transceiver station 14 is illustrated in FIG. 1, it is understood that the system 10 may comprise any number of base transceiver stations 14 and any number of portable electronic devices 12. The network 16 may be a public communication network, a private communication network, or a combination thereof.

The server 60 comprises a processor 62, a memory 64 and an application 66 stored in the memory. The data store 70 comprises a plurality of prepaid and postpaid accounts for wireless voice and data services. The application 66 receives requests to merge two or more existing prepaid wireless accounts 72, 74 into a single multi-line account 76. The multi-line account 76 may be newly established for the merger of the at least two exiting prepaid wireless accounts 72, 74. The multi-line account 76 may alternatively be an already established and fully active account containing other prepaid or postpaid accounts. In an embodiment, the application 66 determines a third cycle date for a master prepaid account, where the master prepaid account is an example of a multi-line account 76, where a cycle date comprises the first day of usage periods for prepaid accounts and where payments for prepaid accounts are due on cycle dates. In some contexts, the third cycle date may be referred to as a consolidated cycle date. The application 66 determines that a first prepaid account 72 is associated with a first cycle date for a first usage period and a second prepaid account 74 is associated with a second cycle date where the first cycle date, the second cycle date, and the third cycle date differ from each other. A first prorated amount may be determined by multiplying a first fraction times a first periodic payment associated with the first usage period of the first prepaid account 72 where the first fraction comprises a remaining fraction of a current first usage period. A second prorated amount may be determined by multiplying a second fraction times a second periodic payment associated with the second usage period of the second prepaid account 74 where the second fraction comprises a remaining fraction of a current second usage period. The application 66 calculates prorated amounts or credits associated with the prepaid wireless accounts 72, 74. The first prorated amount is added to the second prorated amount to determine a first credit. The application 66 discontinues individual billing for the first prepaid account 72 and the second prepaid account 74 and applies the first credit to a first master payment amount payable on the third cycle date under the master prepaid account. Because the merging prepaid wireless accounts 72, 74 may have different cycle dates as well as prepaid payment amounts, the application 66 calculates individual credits for each closing prepaid wireless accounts 72, 74, combines the individual credits, and applies the total to amounts owing under the master prepaid account.

In an embodiment, the first prepaid account 72 and the second prepaid account 74 are associated with wireless voice and data services usage by a first portable electronic device 12 and a second portable electronic device 12 respectively. The first prepaid account 72 is associated with the first portable electronic device 12 and the second prepaid account 74 is associated with the second portable electronic device 12. Each account is funded to provide wireless voice and data services usage by the respective portable electronic device 12. The prepaid accounts are not related to each other prior to being consolidated into a multi-line account 76.

In an embodiment, the master payment amount is due on the third cycle date as payment for usage of wireless voice and data services previously accessed by the first portable electronic device 12 and the second portable electronic device 12 under the first prepaid account 72 and the second prepaid account 74 respectively. The cycle or payment due dates of the merging prepaid wireless accounts 72, 74 may differ from each other and they may differ from the cycle date of the master prepaid account. The application 66 converts the cycles of the merging prepaid wireless accounts 72, 74 to a single payment cycle for the multi-line account 76. The master prepaid account may make a single periodic payment for services used by the portable electronic devices 12 associated with the merging prepaid wireless accounts 72, 74. After merger of the two prepaid wireless accounts 72, 74, the master prepaid account makes one payment per billing period, for example monthly, which pays for the wireless services provided to the portable electronic devices 12.

In an embodiment, the application 66 creates the master prepaid account for consolidation of the first prepaid account 72 and the second prepaid account 74. The master prepaid account may be newly established for the merger of the two existing prepaid wireless accounts 72, 74. In this case, the master prepaid account may be created for the purpose of sharing voice and data services between the first and second portable electronic devices 12 and may also result in a discount over maintaining separate prepaid accounts.

In an embodiment, the application 66 promotes users of the first portable electronic device 12 and the second portable electronic device 12 to purchase at least one of ring tones, wallpapers, and other electronic products under the master prepaid account. The application 66 may be configured to provide the users other than the lead user various levels of permissions to draw on the deposit account to make product purchases and exceptional service usages. In an embodiment, the application 66 further promotes payment for the at least one of ring tones, wallpapers, and other electronic products under the master prepaid account to be one of received directly from the users of the first portable electronic device 12 and the second portable electronic device 12 and added to the next due master payment amount. Such levels of permissions may range from allowing the users full freedom to make any purchases they wish that may completely empty the deposit account, to requiring users to secure permission from the lead user to make purchases, to prohibiting the users from accessing or even viewing the deposit account for any reason.

In an embodiment, a sub-account may be opened for at least one individual user other than the lead user. The sub-account may be stocked funds and replenished by the user authorized to draw on it or by the lead user. The uses of the funds in the sub-account may be restricted by the lead-user. When the sub-account is exhausted of funds, the lead user may not replenish it until the beginning of another time period. The lead user may effectively provide the other user(s) a periodic "allowance" that they may use for restricted purposes. The monetary contents of the sub-account may be segregated from those of the deposit account used by the master prepaid account.

In an embodiment, the first prorated amount and the second prorated amount comprise paid amounts for unused paid time remaining in the current first usage period and the current second usage period, respectively. The application 66 calculates prorated amounts or credits associated with the prepaid wireless accounts 72, 74 where the prepaid wireless accounts 72, 74 are terminated with paid time or usage units still remaining when the prepaid wireless accounts 72, 74 are closed and merged. The credits are calculated for the remaining paid time under the closing prepaid wireless accounts 72, 74 and applied to a first payment or next payment owing on the master prepaid account.

In an embodiment, the application 66 consolidates the first prepaid account 72 and the second prepaid account 74 into the master prepaid account where the master prepaid account is a pre-existing account. The master prepaid account may exist prior to the merger and may be either a prepaid or postpaid account and may encompass more than one device or subscriber prior to receiving the prepaid wireless accounts 72, 74 in the merger. If the master prepaid account previously included only a single prepaid or postpaid account, by definition it would not have been multi-line. An administrator may access the application 66 and designate the single account as a multi-line account 76. The application 66 then associates functionality with the newly designated master prepaid account that permits the prepaid wireless accounts 72, 74 to join the master prepaid account, either at the same time or at different times.

The present disclosure envisions one designated portable electronic device 12 user or lead user to be primarily responsible for the master prepaid account and authorize payments under the master prepaid account that cover the portable electronic devices 12 included in the master prepaid account. The lead user may make remittances into a deposit account established by the telecommunications service provider for the master prepaid account. The telecommunications service provider may charge or debit the deposit account on the cycle date of the master prepaid account for a predetermined subscription amount. The predetermined amount pays for wireless services for the merged prepaid wireless accounts 72, 74. The predetermined amount may not be the total of the previous periodic payments of the at least two prepaid wireless accounts 72, 74 that merged. The telecommunications service provider may apply a discount to the total or may apply a different rating and pricing structure or schedule to the master prepaid account.

In an embodiment, the lead user responsible for the master prepaid account or another party may deposit various amounts of funds at various times into the deposit account associated with the master prepaid account. The funds may be used for charges in addition to the periodic subscription charge to cover the monthly wireless services for the included portable electronic devices 12 and subscribers. When the deposit account has a positive balance, the funds may be drawn upon by the lead user or by other authorized users to purchase ringtones, wallpapers, and other electronic media for installation on the portable electronic devices 12. The funds may also be drawn upon, subject to authorization, to pay for services beyond those included in the master prepaid account, for example the placement of international calls.

The telecommunications service provider may offer wireless services under a plurality of subscription plans. Subscription plans comprise prepaid plans wherein a subscriber pays a fixed amount at the beginning of a defined usage period, for example one month, and receives unlimited wireless services during the usage period. The unlimited wireless services may comprise minutes of voice conversation and units of short message service (SMS) messaging, hereafter text messaging. At the end of the usage period the subscriber pays the fixed amount again and continues to receive the unlimited wireless services for another usage period of the same duration as previously. Other prepaid plans may require a payment in advance for a fixed amount of wireless services, unrelated to time. When the fixed amount of services is used regardless of time period, the subscriber pays again for more services. This arrangement may be referred to as "pay as you go" or "paygo". The telecommunications service provider may also offer postpaid subscription plans wherein subscribers pay for services consumed during a time period after the close of the time period. Postpaid subscription plans may cover a limited amount of services with consumption over the limit paid per unit of service used. Postpaid subscribers may receive an invoice after the close of the billing period that details their wireless services usage including usage amounts in excess of fixed amounts wherein these usage amounts result in charges above a monthly fixed charge.

The telecommunications service provider may determine that it makes commercial sense to provide incentives that may induce two or more prepaid accounts to merge into the multi-line account 76. Generating a single invoice to the lead user of the multi-line account and dealing solely with the lead user on collection, customer care and other multi-line account 76 matters may be economically attractive to the telecommunications service provider. Invoicing once per month or other period may be more cost effective than notifying a plurality of prepaid customers at various times of a month that their monthly payments are due, awaiting their payments, and taking the steps of shutting off the prepaid wireless service in the event of nonpayment. This cost effectiveness may be particularly pronounced when the lead user is demonstrated to be financially responsible. The other users may, in addition, have a relationship with the lead user such that the lead user does not want the other users to be concerned with financial matters related to their wireless services usage. This may be the case in an employer/employee relationship. It may be in the interest of the lead user that the other users concentrate on their assigned responsibilities and are not distracted by the need to make periodic advance payments and submit reimbursement requests.

Aside from cost considerations associated with billing, collecting, and managing a single encompassing account versus a plurality of smaller accounts, the telecommunications service provider may determine that customer loyalty and retention are maintained when two or more prepaid wireless accounts 72, 74 can be merged into a single multi-line account 76. After merger, the users of the portable electronic devices 12 other than the lead user need not be concerned on a monthly or other periodic basis about financial matters. Because a prepaid wireless account may be suspended and not be reactivated and perhaps permanently lost because a subscriber associated with the prepaid wireless account forgets to make a payment or receives and accepts an offer of a different periodic payment, the telecommunications service provider may seek ways to circumvent this. The telecommunications service provider seeks to reduce subscriber turnover or churn and improve retention by reducing situations that may lead to prepaid wireless accounts 72, 74 discontinuing payment and the subscribers moving to competitors. The telecommunications service provider may seek to introduce "stickiness" into its wireless subscription offerings where subscribers have less incentive and reason to drop their prepaid wireless accounts 72, 74 and move to a competitor. Combining two or more prepaid wireless accounts 72, 74 into the multi-line account 76 and dealing primarily with the lead user for financial matters may improve stickiness and reduce turnover by prepaid wireless accounts 72, 74.

A business or other organization may employ individuals that use portable electronic devices 12 in their daily work, for example field salespeople, drivers, or jobsite supervisors, for example. For their work, these individuals may not need wireless services beyond voice, text messaging, and limited Internet browsing capability on simple portable electronic devices. These types of users represent viable candidates for prepaid wireless accounts 72, 74 because of their limited needs. However, because the periodic prepaid subscription payments are business expenses and the users may personally make the prepaid payments and thereafter seek reimbursement from their employers, the users may forget to make the payments or delay doing so, thus increasing the risk that their prepaid wireless accounts 72, 74 may be closed for nonpayment. In addition, because each of the prepaid wireless accounts 72, 74 associated with employees may have different cycle or due dates, the employer may be tasked with processing numerous relatively small expense reimbursement requests each month, with the expense items submitted for reimbursement at various times of the month. This situation may present budgeting, cash flow, and processing burdens for a small organization. In addition, by having a plurality of employees with individual prepaid wireless accounts 72, 74, the employer may not be receiving any volume or group discounts associated with its providing revenue associated with multiple users to the telecommunications service provider.

The present disclosure teaches a system and methods that provide the telecommunications service provider a means to unify a plurality of prepaid wireless accounts 72, 74 that as freestanding accounts present cancellation risks and wherein after merger promote simplified billing and management as well as stickiness. For the employer or other organization, the system and methods promote the consolidation of a plurality of prepaid wireless accounts 72, 74 with disparate cycle dates and differing periodic payment amounts into a single periodic obligation on its own payables cycle that streamlines account processing and may result in discounts to the employer.

The application 66 may begin by establishing the master prepaid account as a multi-line account 76 and setting the cycle date for the master prepaid account. Cycle date as used herein is the due date of the master prepaid account. The term cycle date is also used to describe due dates of the prepaid wireless accounts 72, 74 before they are merged into the master prepaid account and closed. In an embodiment, the cycle date set for the master prepaid account is different from the cycle dates for the prepaid wireless accounts 72, 74 that may be different from each other. The cycle date for the master prepaid account may be set at the convenience of the employer or other organization or party in whose name the master prepaid account is being opened or was previously opened. The cycle date for the master prepaid account may be set, for example, to fit into the customer's cash flow or payables cycle for the month or other period. For purposes of the present discussion, the master prepaid account is itself a prepaid account such that payment for services is made on the cycle date at the beginning of a usage period, for example a month.

While working with the customer to determine cycle date of the master prepaid account, the telecommunications service provider also determines pricing for the master prepaid account. The monthly prepaid rate for the master prepaid account is unlikely to be merely a total of the two prepaid rates for the prepaid wireless accounts 72, 74 before they are merged. In an embodiment, the telecommunications service provider may provide a multi-line discount such that the monthly prepaid rate for the master prepaid account is less than the total of the two individual prepaid rates. The telecommunications service provider may consult the rating engine and/or pricing models to determine a rate for the master prepaid account.

The application 66 then examines the cycle dates of the prepaid wireless accounts 72, 74. Because, in this example, the cycle dates of the prepaid wireless accounts 72, 74 differ from the cycle date of the newly established master prepaid account, the master prepaid account will be starting when the prepaid wireless accounts 72, 74 are only partially finished with their paid usage periods. The cycle date for the master prepaid account may be set as the $1^{st}$ of each month. The master prepaid account is configured to make its subscription payment on the $1^{st}$ of each month. In this example, the cycle date for the first prepaid wireless account 72 is the $11^{th}$ of each month and the cycle date for the second prepaid wireless account 74 is the $21^{st}$ of each month. The first prepaid wireless account 72 makes its fixed monthly payment of the $11^{th}$ of each month for service starting on that day and continuing through the $10^{th}$ of the following month. The second prepaid wireless account 74 makes its fixed monthly payment on the $21^{st}$ of each month for service starting on that day and continuing through the $20^{th}$ of the following month.

The prepaid wireless accounts 72, 74 are closed and the master prepaid account is opened on the $1^{st}$ of the month in this example. For purposes of simplicity, the current month in this example has thirty days, for example the months of April, June, September, or November. On the $1^{st}$ of the following month, the first prepaid wireless account 72 has ten days remaining of paid wireless services and the second prepaid wireless account 74 has twenty days remaining of paid wireless services. When these two prepaid wireless accounts 72, 74 are closed on the $1^{st}$ of the month, the first and second prepaid wireless accounts 72, 74 deserve to be credited for their remaining ten and twenty days, respectively, of paid service. In this example, the prepaid wireless accounts 72, 74 previously each pay $60.00 per month for unlimited wireless voice, text, and internet access service. On the $1^{st}$ of the following month, the first prepaid wireless account 72 has ten days value or one third of its monthly amount, therefore $20.00, of credit due it. On the $1^{st}$ of the following month, the second prepaid wireless account 74 has twenty days value or two thirds of its monthly amount, therefore $40.00, of credit due it. The application 66 then adds the two credits for a $60.00 one time total credit and applies the $60.00 total credit on the $1^{st}$ of the following month when the master prepaid account is opened and the prepaid wireless accounts 72, 74 are closed. If, for example, the monthly prepaid rate for the master prepaid account is $110.00 and is due on the $1^{st}$ of the following month, the one time $60.00 total credit may be applied to the $110.00, thus reducing the payment to $50.00 for that first month of the master prepaid account.

The example given provides a simplified scenario of two prepaid wireless accounts 72, 74 merging into a newly created master prepaid account where credits for paid but unused time are calculated and applied to the first payment owing on the master prepaid account that in the example is itself a prepaid account. In practice, the prepaid wireless accounts 72, 74 may have cycle dates different from those in the example and the fractions of remaining amounts of paid time may not work out neatly to the one third and two thirds, respectively, described in the example. The application 66 maintains records of these calculations to demonstrate that the subscribers associated with the merging prepaid wireless accounts 72, 74 receive equitable value for their paid but unused time on the day of closure on the $1^{st}$ of the following month. By maintaining these records, the telecommunications service provider may provide better service in the event subscribers or others question how the prepaid wireless accounts 72, 74 were closed and how credits for paid time were calculated and applied to the master prepaid account.

While the master prepaid account in the example is itself is a prepaid account, it could alternatively be a postpaid multi-line account 76 wherein the $110.00 example monthly amount is paid not on the $1^{st}$ of the following month but on a day in excess of thirty days past the end of the first month. In this example, the $60.00 credit would be applied to the $110.00 as previously, only thirty days later at the end, instead of the beginning of the first month of the multi-line account 76.

An alternative situation wherein prepaid wireless accounts 72, 74 merge into a single master prepaid account may entail the paid periods of the prepaid wireless accounts 72, 74 ending, their subscribers not making further payment, and an interim unpaid period passing before the master prepaid account starts. In this scenario, amounts owing could be calculated for the interim period on the two prepaid wireless accounts 72, 74 and these amounts would be added to (instead of credited to and therefore subtracted from) the first payment due on the master prepaid account. Using the sample data provided above, this example assumes instead that the subscribers under the prepaid wireless accounts 72, 74 do not make their payments in the month prior to the beginning of master prepaid account. They therefore effectively carry over charges or liabilities instead of credits to the master prepaid account. Whereas in the previous example, the first prepaid wireless account 72 made its payment on the $11^{th}$ of the month and therefore carried over a $20.00 credit, in this example, the first prepaid wireless account 72 does not make the payment and instead begins to accumulate liability for continued use. By the $1^{st}$ of the following month, the first prepaid wireless account 72 has accumulated a charge of $40 associated with its twenty days of unpaid use.

Similarly, whereas in the previous example, the second prepaid wireless account 74 made its payment on the $21^{st}$ of the month and therefore carried over a $40.00 credit, in this example, the second prepaid wireless account 74 does not make the payment and instead begins to accumulate liability for continued use. By the $1^{st}$ of the following month, the first prepaid wireless account 72 has accumulated a charge of $20.00 associated with its ten days of unpaid use. On that day when the master prepaid account is to be opened, the application 66 sums the $40.00 and $20.00 accrued charges for the first and second prepaid wireless accounts 72, 74, respectively, for a $60.00 total charge. The $60.00 total charge is added to the $110.00 first payment due on the master prepaid account for a total first payment of $170.00. The prepaid wireless accounts 72, 74 are then closed out with zero balances. As with the previous example, the application 66 maintains records of how the charges for the interim period are calculated and applied to the amount owing on the multi-line account 76. In addition, the multi-line account 76 may itself be a postpaid account instead of a prepaid account wherein the $60.00 charge is added to the $110.00 owing at the end of, instead of the beginning of, the first month of the multi-line account 76.

The discussion of the two examples provided was based on the assumption that the multi-line account 76 was newly established for the merger of the prepaid wireless accounts 72, 74. In an embodiment, the multi-line account 76 may exist prior to the merger and may be either a prepaid or postpaid account and may encompass more than one device or subscriber prior to receiving the prepaid wireless accounts 72, 74 in the merger. The application 66 then associates functionality with the newly designated multi-line account 76 that permits the prepaid wireless accounts 72, 74 to join the multi-line account 76, either at the same time or at different times. The prepaid wireless accounts 72, 74 are provided credentials to log into the application 66, authenticate on a limited basis, and request to be merged into the multi-line account 76. Authorizations or instructions may have already been entered into the data store 70 regarding terms for the prepaid wireless accounts 72, 74 joining the multi-line account 76. The terms may describe what final payments, if any, are to be made by the merging prepaid wireless accounts 72, 74 and how associated prorations or credits may be calculated and applied or alternatively how interim or topup charges are to be calculated and added.

The terms may describe a pricing structure to be applied to the multi-line account 76, with different pricing implemented depending on the quantity of prepaid wireless accounts 72, 74 that are merged into the multi-line account 76 and their timetable(s) for merger. The authorizations or instructions may also designate one of the merging prepaid wireless accounts 72, 74 or one of the accounts previously part of the multi-line account 76 as the lead account. The user associated with the lead account may be provided responsibilities and privileges beyond those of other users, such as the responsibility to replenish the deposit account as well as privileges regarding granting permissions to other portable electronic devices 12 in the multi-line account 76. Privileges for the lead user may also include the right to phone into a support function of the telecommunications service provider.

When prepaid wireless accounts 72, 74 log into the application 66 to be merged into the multi-line account 76, the application 66 calculates prorations as well as determining the pricing of the multi-line account 76. The application 66 analyzes the type of accounts that are the prepaid wireless accounts 72, 74 and their historical wireless services usage and payment histories. The application 66 also examines the multi-line account 76, its existing terms, and the user that has been designated the lead user and hence the financially responsible party. The application 66 determines terms to set for the merger of the prepaid wireless accounts 72, 74 and terms going forward for the multi-line account 76 after merger.

The present disclosure teaches the application 66 remaining accessible to users and their portable electronic devices 12 after the prepaid wireless accounts 72, 74 have merged into the multi-line account 76 and the prepaid wireless accounts 72, 74 cease to exist as independent, free-standing accounts. Depending upon privileges approved by the lead user, the other users may log into the application 66 to make selected, preauthorized changes to their available wireless services under the multi-line account 76. Users other than the lead user may also execute some transactions using their portable electronic devices 12. They may be permitted to purchase ring tones, wallpapers, and other electronic products or access additional services such as making international calls. They may be given limited access to the deposit account, over which the lead user has full authority and responsibility. The lead user may specify the types and financial limits of transactions that the other users may execute.

Figure 2:
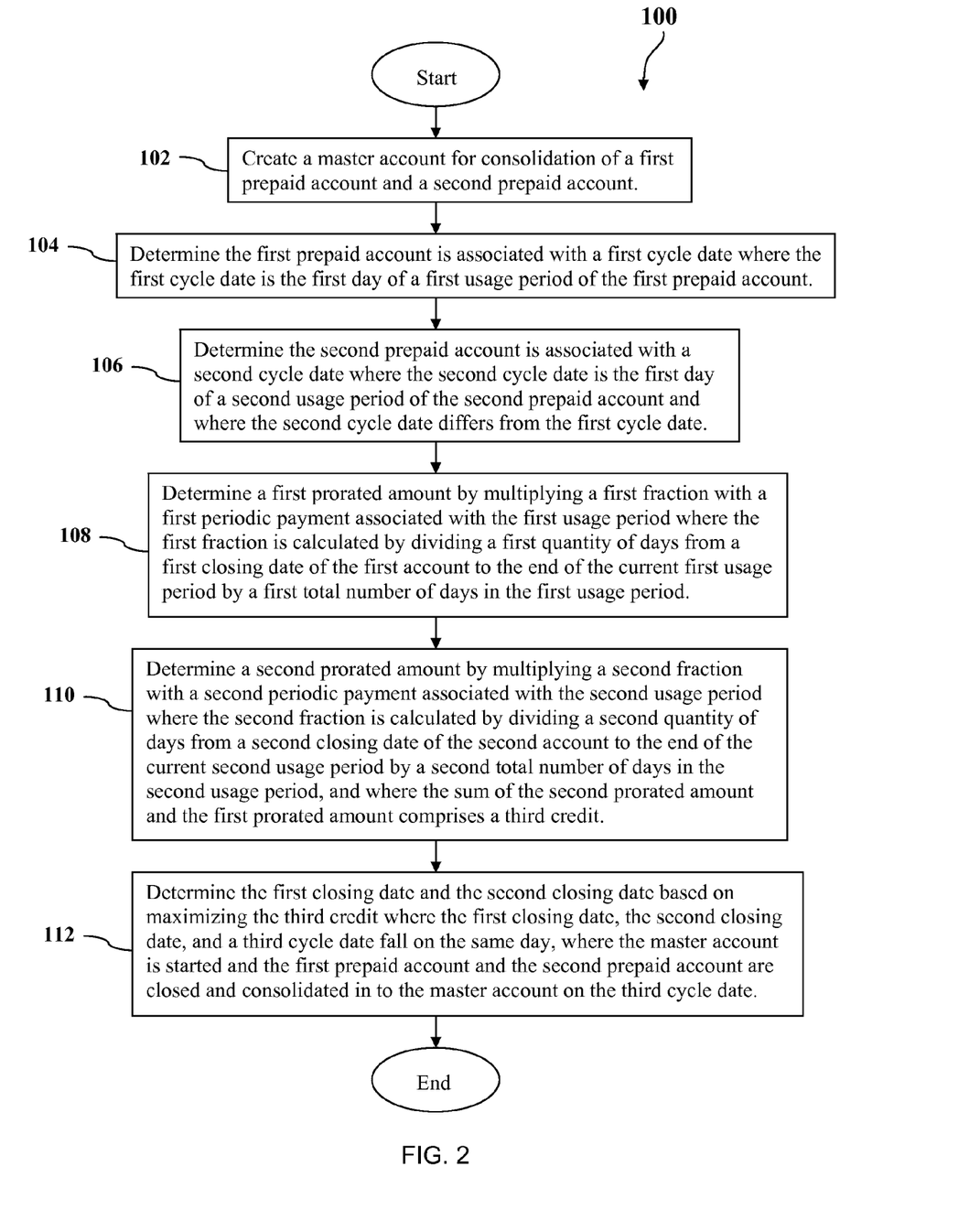
FIG. 2 is a flow chart of a method according to an embodiment of the disclosure.

Turning now to FIG. 2, a processor implemented method 100 is described. At block 102, a master account is created for consolidation of a first prepaid account 72 and a second prepaid account 74. Merging the first and second prepaid accounts, 72, 74 into a master account may provide benefits for the users in the form of discounts and shared minutes and data. At block 104, a first cycle date associated with the first prepaid account 72 is determined where the first cycle date is the first usage day of a first usage period of the first prepaid account 72. The first cycle date denotes when the first usage period of the first prepaid account 72 began, which in turn suggests the end of the first usage period as well. For example, a first cycle date on the $10^{th}$ of the month and a first usage period of one month would suggest the end of the first usage period would be the $9^{th}$ of the following month. At block 106, a second cycle date associated with a second prepaid account 74 is determined where the second cycle date is the first day of a second usage period of the second prepaid account 74 and where the second cycle date differs from the first cycle date. The second cycle date denotes when the second usage period of the second prepaid account began, and would also be used to determine the end of the second usage period. The second cycle date is different from the first cycle date as the two prepaid accounts 72, 74 were previously not related or associated in any manner.

At block 108, a first prorated amount is determined by multiplying a first fraction times a first periodic payment associated with the first usage period where the first fraction is calculated by dividing a first quantity of days from a first closing date of the first account to the end of the current first usage period by a first total number of days in the first usage period. The first periodic payment is multiplied by the percentage of days remaining in the first usage period to calculate the first prorated amount. At block 110, a second prorated amount is determined by multiplying a second fraction with a second periodic payment associated with the second usage period where the second fraction is calculated by dividing a second quantity of days from a second closing date of the second account to the end of the current second usage period by a second total number of days in the second usage period, and where the sum of the second prorated amount and the first prorated amount comprises a third credit. The second periodic payment is multiplied by the percentage of days remaining in the second usage period to calculate the second prorated amount, which is added to the first prorated amount to comprise the third credit.

At block 112, the first closing date and the second closing date are determined based on maximizing the third credit where the first closing date, the second closing date, and a third cycle date fall on the same day, where the multi-line account 76 is started and the first prepaid account 72 and the second prepaid account 74 are closed and consolidated in to the multi-line account 76 on the third cycle date. The first and second closing date are calculated to maximize the third credit, given that the first and second prepaid accounts 72, 74 will both be closed on the same closing date and will be under the multi-line account 76 from that date forward.

In an embodiment, the first prepaid account 72 is associated with a first portable electronic device 12 and the second prepaid account 74 is associated with a second portable electronic device 12. Each of the first and second prepaid accounts 72, 74 is an individual account associated with a single portable electronic device 12, which are being merged into a multi-line account 76 associated with a plurality of portable electronic devices 12. In an embodiment, the first portable electronic device 12 and the second portable electronic device 12 continue to receive access to wireless voice and data services under the multi-line account 76 as previously under the first prepaid account 72 and the second prepaid account 74, respectively. The wireless voice and data services continue as prior to merging to the multi-line account 76, the change is made to the billing of the accounts and to the access the first and second portable electronic device 12 users may be granted to the multi-line account 76. In an embodiment, individual billing for the first prepaid account 72 and the second prepaid account 74 discontinue upon the consolidation. After merger of the two prepaid wireless accounts 72, 74, the multi-line account 76 makes one payment per billing period, for example monthly, that pays for the wireless services provided to the portable electronic devices 12 whose previous individual prepaid wireless accounts 72, 74 are closed.

In an embodiment, the first closing date and the second closing date are determined based on maximizing the third credit to set the third cycle date for the multi-line account 76 where out-of-pocket expenditure is minimized. This may depend in part on whether the multi-line account 76 is itself a prepaid or a postpaid account. Minimizing the out-of-pocket cash outlay may involve setting the timing of the closure of the prepaid wireless accounts 72, 74 combined with the setting of the pricing and payment schedule of the multi-line account 76. When the cycle dates of the prepaid wireless accounts 72, 74 are different from each other and/or when their periodic prepaid amounts differ, minimizing the cash outlay may involve causing the prepaid wireless accounts 72, 74 to close out and be merged into the multi-line account 76 at different times, for example several weeks apart. The closure of the prepaid wireless accounts 72, 74 when they have unused paid time remaining may result in a credit to be applied to the first or next payment owing on the multi-line account 76. The application 66 may access one or more algorithms to perform these scheduling analyses to assist in minimizing cash outlay for the subscribers.

In an embodiment, the multi-line account 76 is one of a prepaid account and a postpaid account. The multi-line account 76 may itself be a prepaid account or may alternatively be a postpaid account. The multi-line account 76 may consolidate existing prepaid wireless accounts 72, 74 with existing postpaid accounts and may receive incentives to be a prepaid or postpaid account itself. In an embodiment, the determination of the third cycle date is based on an analysis of daily account processing load statistics of a telecommunication service provider and where the third cycle date is established on a day of a month associated with less than average daily account processing load. In determining a schedule for merging prepaid wireless accounts 72, 74 and therefore creating the multi-line account 76 and establishing its cycle date when the multi-line account 76 is not pre-existing, other factors may receive consideration. The telecommunications service provider may wish to set the new cycle date on a day of the month or other period when billing operations are not already heavy, so as to reduce processing load on a billing server and billing application. The telecommunications service provider may set the new cycle date to serve its cash flow needs or accounting requirements or conventions.

Figure 3:
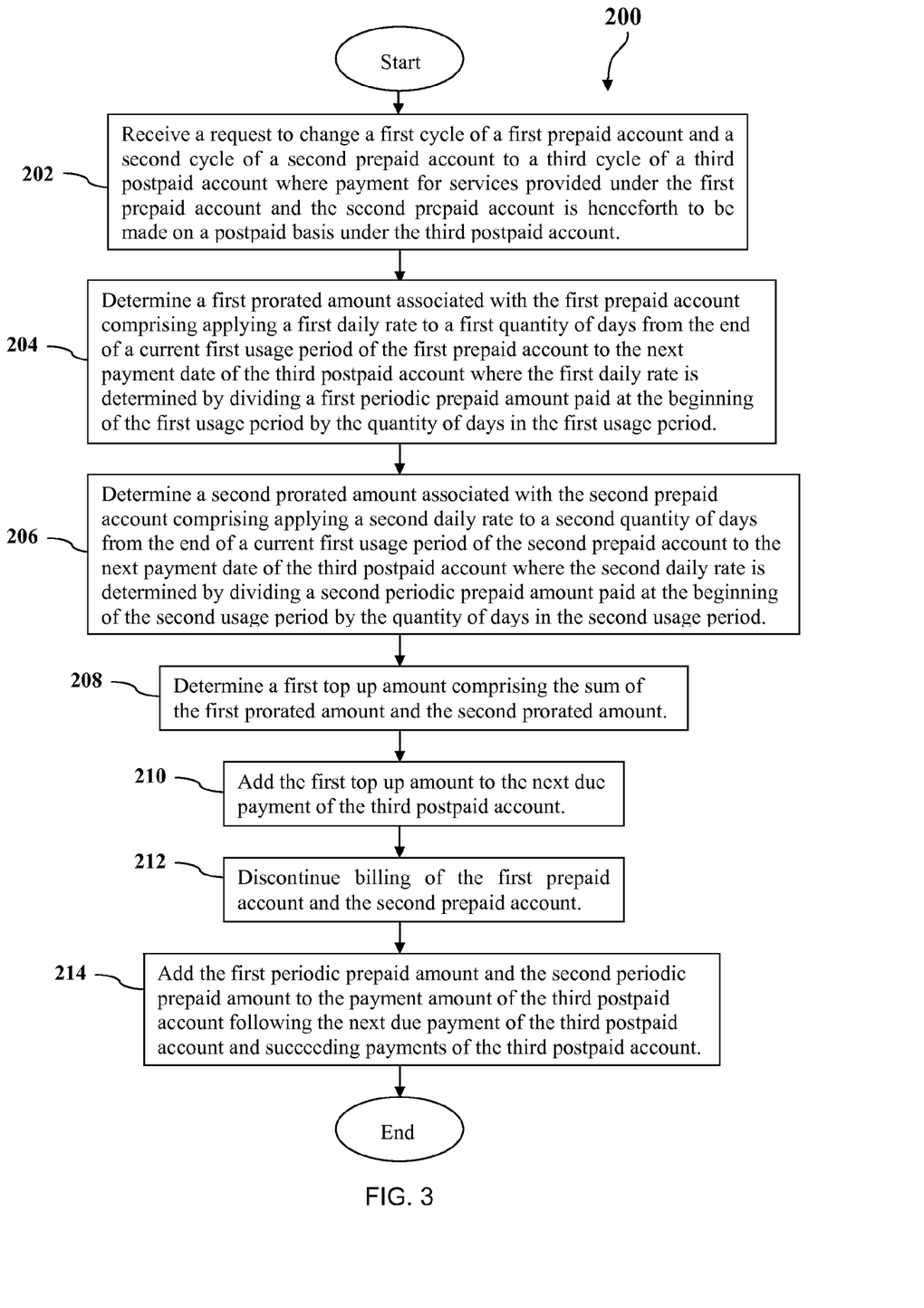
FIG. 3 is a flow chart of a method according to an embodiment of the disclosure.

Turning now to FIG. 3, a processor implemented method 200 is described. At block 202, a request to change a first cycle of a first prepaid account 72 and a second cycle of a second prepaid account 74 to a third cycle of a third postpaid account is received where payment for services provided under the first prepaid account 72 and the second prepaid account 74 is henceforth to be made on a postpaid basis under the third postpaid account. The first and second prepaid accounts, 72, 74 are requested to be combined as a multi-line account 76 under the postpaid cycle of the third account.

At block 204, a first prorated amount associated with the first prepaid account 72 comprising applying a first daily rate to a first quantity of days from the end of a current first usage period of the first prepaid account 72 to the next payment date of the third postpaid account is determined where the first daily rate is determined by dividing a first periodic prepaid amount paid at the beginning of the first usage period by the quantity of days in the first usage period. The remaining unused portion of the first prepaid account 72 is calculated using a daily rate of the first prepaid account 72 times the number of days to the next payment date of the third postpaid account. At block 206, a second prorated amount associated with the second prepaid account 74 comprising applying a second daily rate to a second quantity of days from the end of a current first usage period of the second prepaid account 74 to the next payment date of the third postpaid account is determined where the second daily rate is determined by dividing a second periodic prepaid amount paid at the beginning of the second usage period by the quantity of days in the second usage period. The remaining unused portion of the second prepaid account 74 is calculated using a daily rate of the second prepaid account 74 times the number of days to the next payment date of the third postpaid account.

At block 208, a first top up amount is determined comprising the sum of the first prorated amount and the second prorated amount. At block 210, the first top up amount is added to the next due payment of the third postpaid account. The sum of the first and second prorated amounts is added as a credit to the third postpaid account. At block 212, billing of the first prepaid account 72 and the second prepaid account 74 is discontinued. After consolidation with the third postpaid account, the first and second prepaid accounts 72, 74 are closed. At block 214, the first periodic prepaid amount and the second periodic prepaid amount is added to the payment amount of the third postpaid account following the next due payment of the third postpaid account and succeeding payments of the third postpaid account. The monthly periodic prepaid amount for the first and second prepaid accounts 72, 74 is added to the next due payment and following monthly payments of the third postpaid account.

In an embodiment, the first prorated amount pays for a first interim period between the end of the first usage period and the next due payment of the third postpaid account and where the second prorated amount pays for a second interim period between the end of the second usage period and the next due payment of the third postpaid account. The first interim period consists of the time between the end of the first usage period and the next payment date of the third postpaid account, and the first prorated amount is the charge added to the bill of the third postpaid account to pay for the first interim period. The second interim period consists of the time between the end of the second usage period and the next payment date of the third postpaid account, and the second prorated amount is the charge added to the bill of the third postpaid account to pay for the second interim period.

In an embodiment, the method 200 further comprises promoting users previously associated with the first prepaid account 72 and the second prepaid account 74 to purchase at least one of ring tones, wallpapers, and other electronic content where payment is one of made separately from and added to the payment amount of the third postpaid account. Additional content and data services are promoted to users and may be paid through a separate sub-account associated with the user and the multi-line account 76, or alternatively the charges may be added to the payment amount of the multi-line account 76.

In an embodiment, a discount is applied to the first periodic prepaid amount and the second periodic prepaid amount upon being added to the payment amount of the third postpaid account. The telecommunications service provider may determine that it makes commercial sense to provide incentives that may induce two or more prepaid accounts to merge into the multi-line account 76. In an embodiment, the method 200 further comprises assigning financial responsibility to a designated account holder of the third postpaid account for services usage associated with the first portable electronic device 12 and the second portable electronic device 12. One portable electronic device 12 user or lead user is designated to be primarily responsible for the multi-line account 76 and authorize payments under the multi-line account 76 that cover the portable electronic devices 12 included in the multi-line account 76. The lead user may make remittances into a deposit account established by the telecommunications service provider for the multi-line account 76. Generating a single invoice to the lead user of the multi-line account 76 and dealing solely with the lead user on collection, customer care and other multi-line account 76 matters may be economically attractive to the telecommunications service provider.

Figure 4:
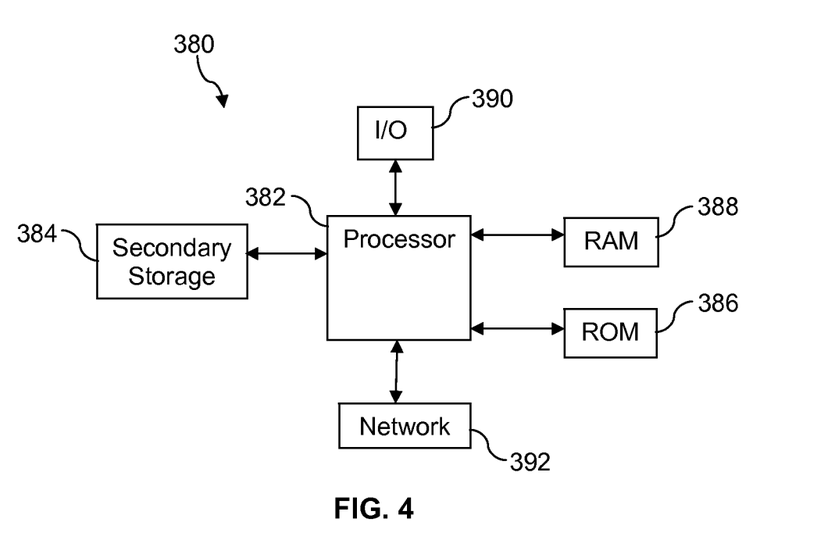
FIG. 4 illustrates an exemplary computer system suitable for implementing the several embodiments of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, a baseband signal and/or a signal embodied in a carrier wave may be referred to as a transitory signal. In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A processor-implemented method of merging a plurality of prepaid accounts into a multi-line account, comprising:

creating, by a computer processor, a master account for consolidation of a first prepaid account and a second prepaid account;

determining, by the computer processor, that the first prepaid account is associated with a first cycle date, wherein the first cycle date is the first day of a first usage period of the first prepaid account;

determining, by the computer processor, that the second prepaid account is associated with a second cycle date, wherein the second cycle date is the first day of a second usage period of the second prepaid account and wherein the second cycle date differs from the first cycle date;

determining, by the computer processor, a first prorated amount by multiplying a first fraction times a first periodic payment associated with the first usage period wherein the first fraction is calculated by dividing a first quantity of days from a first closing date of the first account to the end of current first usage period by a first total number of days in the first usage period;

determining, by the computer processor, a second prorated amount by multiplying a second fraction times a second periodic payment associated with the second usage period, wherein the second fraction is calculated by dividing a second quantity of days from a second closing date of the second account to the end of current second usage period by a second total number of days in the second usage period, and wherein the sum of the second prorated amount and the first prorated amount comprises a third credit; and determining, by the computer processor, the first closing date and the second closing date to maximize the third credit, wherein the first closing date, the second closing date, and a third cycle date fall on the same day, wherein the master account is started and the first prepaid account and the second prepaid account are closed and consolidated into the master account on the third cycle date, and wherein the first closing date, the second closing date, and the third cycle date are different from the first cycle date and the second cycle date.

2. The method of claim 1, wherein the first prepaid account is associated with a first portable electronic device and the second prepaid account is associated with a second portable electronic device.

3. The method of claim 1, wherein the first portable electronic device and the second portable electronic device continue to receive access to wireless voice and data services under the master account as previously under the first prepaid account and the second prepaid account, respectively.

4. The method of claim 1, wherein individual billing for the first prepaid account and the second prepaid account discontinue upon the consolidation.

5. The method of claim 1, wherein the first closing date and the second closing date are determined to maximize the third credit to set the third cycle date for the master account such that out-of-pocket expenditure is minimized.

6. The method of claim 1, wherein the master account is one of a prepaid account and a postpaid account.

7. The method of claim 1, wherein the determination of the third cycle date is based on an analysis of daily account processing load statistics of a telecommunications service provider, and wherein the third cycle date is established on a day of a month associated with less than average daily account processing load.

* * * * *